United States Patent [19]

Gross

[11] 4,260,090
[45] Apr. 7, 1981

[54] DOCUMENT HOLDER

[76] Inventor: James R. Gross, 1080 Independence Dr., Bartlett, Ill. 60103

[21] Appl. No.: 38,747

[22] Filed: May 14, 1979

[51] Int. Cl.³ .............. G07B 15/00; B65D 91/00; A47G 29/00
[52] U.S. Cl. .................. 224/277; 40/10 A; 232/12; 232/4 R; 232/1 C
[58] Field of Search .............. 224/277; 283/1 R; 206/44 B, 44.12, 45.31; 40/5, 10 R, 10 A, 11 R, 15 R, 19; 220/254, 229, 82 R; 232/1 C, 12, 15, 30, 31, 4 R

[56] References Cited

U.S. PATENT DOCUMENTS

| 2,288,222 | 6/1942 | Bockstein | 232/12 |
| 3,042,293 | 7/1962 | Miller | 232/1 C |
| 3,086,674 | 4/1963 | Scheuerman | 232/1 C X |
| 3,533,178 | 10/1970 | Strohmaier | 40/10 A |
| 4,126,267 | 11/1978 | Emmie | 232/4 R |

Primary Examiner—Steven M. Pollard
Attorney, Agent, or Firm—Bernard L. Kleinke

[57] ABSTRACT

A holder for documents, such as traffic parking violation citations includes a hollow elongated housing having a small opening therein to permit a rolled-up or folded-over document to be inserted therethrough and thus into the interior of the housing away from the small opening to trap the document within the housing. A door is swingably mounted over a larger opening in the housing for permitting access to the interior thereof to facilitate the removal of the document therefrom. A lock is provided for maintaining the door in its closed position so that the document or documents confined in the housing may be removed by authorized personnel only. A mounting device connected to the housing enables the holder to be attached fixedly to a surface of a vehicle. At least one fastening device secures fixedly the mounting device in position.

10 Claims, 7 Drawing Figures

DOCUMENT HOLDER

BRIEF SUMMARY OF THE INVENTION

The present invention relates in general to a document holder, and it more particularly relates to a holder which is adapted to be mounted fixedly to an exterior surface of a vehicle for receiving and confining a document, such as a traffic violation citation, until authorized personnel remove it from the holder.

Various different types and kinds of document holders have been known. For example, reference may be made to the following U.S. Pat. Nos. 2,000,419; 2,159,547; 3,047,971; and 3,306,266. While the holders disclosed in the foregoing patents may have been used successfully in some applications, it would be highly desirable to have a document holder which is adapted to be mounted fixedly to an exterior surface of a vehicle so that a document, such as a parking violation citation, can be inserted into the holder and remain confined therein until removed by authorized personnel. In this regard, many different types and kinds of publicly used vehicles, such as rental automobiles and trucks, taxi cabs, delivery trucks, and the like, oftentimes receive citations for parking violations and the citations are inadvertently or otherwise removed therefrom and lost or discarded. As a result, the driver of the vehicle may not always be held accountable for paying the fine associated with the citation, but instead, the owner of the vehicle is oftentimes required to pay the fine when a citation is lost or discarded. Thus, it would be highly advantageous to have a document holder which prevents or at least tends to make it extremely difficult or inconvenient for an unauthorized person to remove a citation from a vehicle and which also protects the document from unfavorable weather conditions. Such a document holder should be convenient to use in that a police officer or other public official can quickly insert the document therein in a facile manner to encourage its use. The document holder should be relatively inconspicuous and asthetically pleasing in appearance, and yet it must be mounted in plain view so that the police officer knows immediately that the offending vehicle is equipped with the holder. It should also be relatively inexpensive to manufacture.

Therefore, the principal object of the present invention is to provide a new and improved document holder, which is adapted to be mounted on a vehicle in a relatively inconspicuous manner for receiving and confining a document, such as a parking violation citation in a convenient manner, until authorized personnel subsequently remove it from the holder.

Another object of the present invention is to provide such a new and improved document holder, which is relatively inexpensive to manufacture, and which is convenient to use and asthetically pleasing in appearance.

Briefly, the above and further objects of the present invention are realized by providing a document holder having a hollow elongated housing, which includes a small opening therein to permit a folded or coiled document to be inserted into the interior of the housing to fall away from the small opening, thereby to trap the document therein. An access door is swingably mounted over a larger opening in the housing and permits access to the interior of the housing to facilitate the removal of the document therefrom. A lock maintains the door in its closed position until unlocked by authorized personnel. A mounting device is connected to the housing for attaching the housing to an exterior surface of the vehicle, such surface being the edge of the hood near the windshield at or near the location where a citation is ordinarily placed by a police officer. At least one fastening device fixes the mounting device to the exterior surface of the vehicle.

BRIEF DESCRIPTION OF THE DRAWINGS

The above-mentioned and further objects and features of this invention and the manner of attaining them will become apparent, and the invention itself will be best understood by reference to the following description of embodiments of the invention taken in conjunction with the accompanying drawings, wherein.

DETAILED DESCRIPTION

Figure 1:
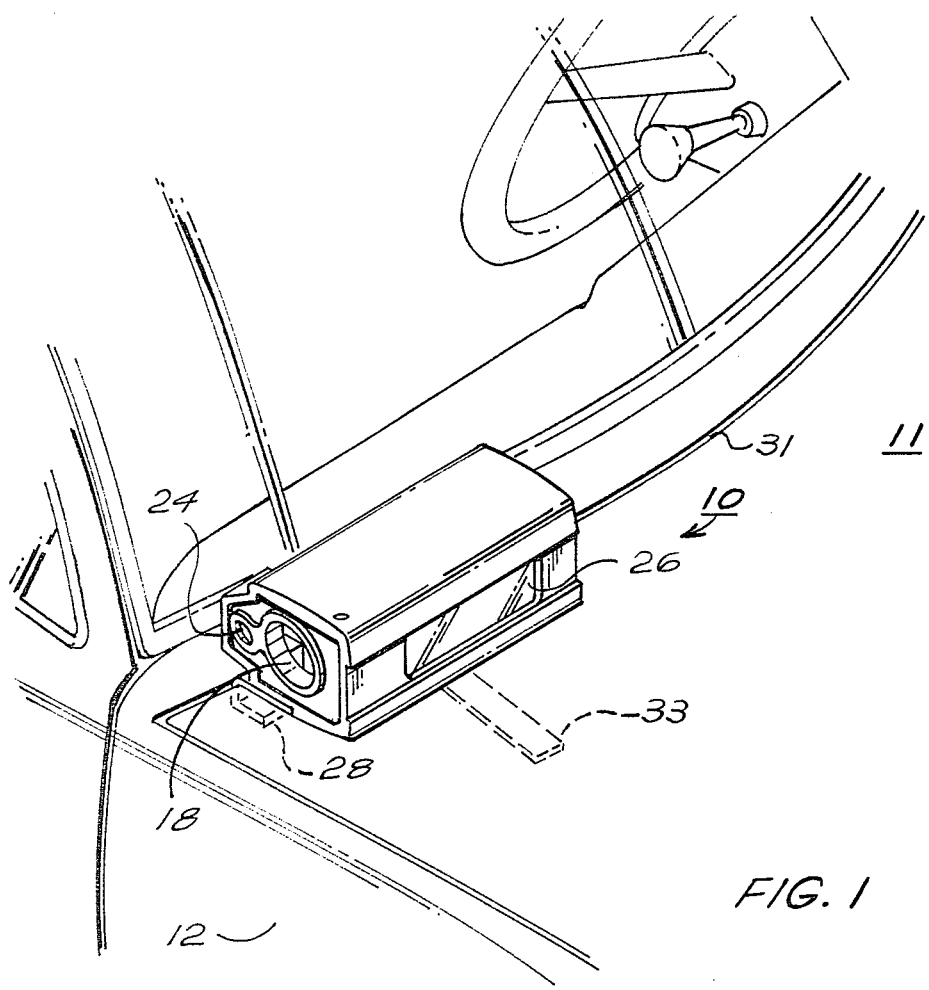
FIG. 1 is a pictorial fragmentary view of a document holder, which is constructed in accordance with the present invention, and which is shown mounted on an exterior surface of a vehicle.
Figure 2:
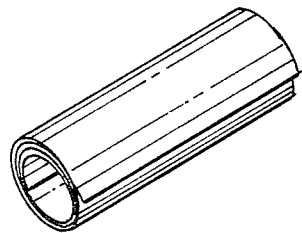
FIG. 2 is an enlarged pictorial view of a rolled up or coiled document, such as a parking violation citation, which is adapted to be inserted into the holder of FIG. 1.

Referring now to the drawings and more particularly to FIGS. 1, 2, 3, 4 and 5, there is shown a document holder 10, which is constructed in accordance with the present invention, and which is shown attached to the hood 11 of a vehicle, such as an automobile 12. The holder 10 serves as a receptacle and is adapted to receive and confine therein a document, such as a parking violation citation 14 (FIG. 2), which is first rolled up or coiled about a transverse axis into a tubular configuration as indicated in FIG. 2 of the drawings and then inserted into the holder 10 which confines it therein until authorized personnel open the holder 10 and are permitted access thereto, as hereinafter described in greater detail.

Figure 4:
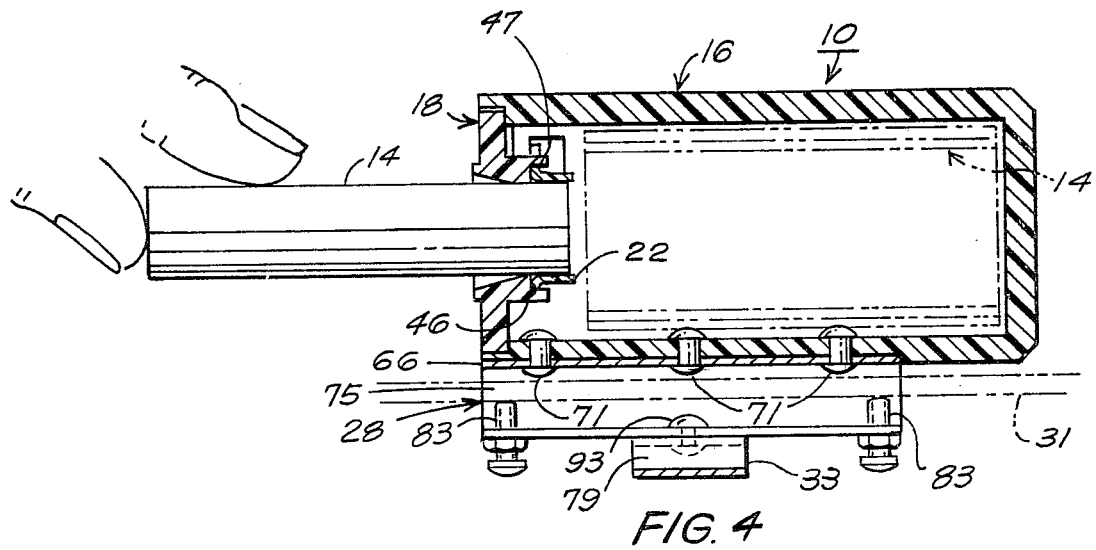
FIG. 4 is a side elevational cross-sectional view of the holder of FIG. 3 taken substantially along line 4—4 thereof, showing the document being inserted therein.

The holder 10 generally comprises a hollow elongated rigid open-ended housing 16, which has a door 18 swingably mounted at one end thereof for closing off the interior of the housing 16. A generally circular small opening 20 extends through the door 18 and permits the rolled up or coiled document 14 to be inserted therethrough and into the interior of the housing 16 as indicated in FIG. 4 of the drawings. An openable seal member 22 extends over the circular opening 20 on the inside of the door 18 of the housing 16 to seal off the interior thereof from outside weather conditions so as to protect the document 14. A lock 24 maintains the door 18 in its closed position until authorized personnel use a key 25 (FIG. 5) to unlock the door 18 to permit it to swing into an open position for permitting access to the interior of the housing 16 as hereinafter described in greater detail. At the front and back sides of the housing 16, there is disposed a pair of vertical windows, generally indicated at 26 and 27, to permit the interior of the housing 16 to be exposed to view so that authorized personnel can readily detect visually the presence of the document 14 contained therein.

Figure 3:
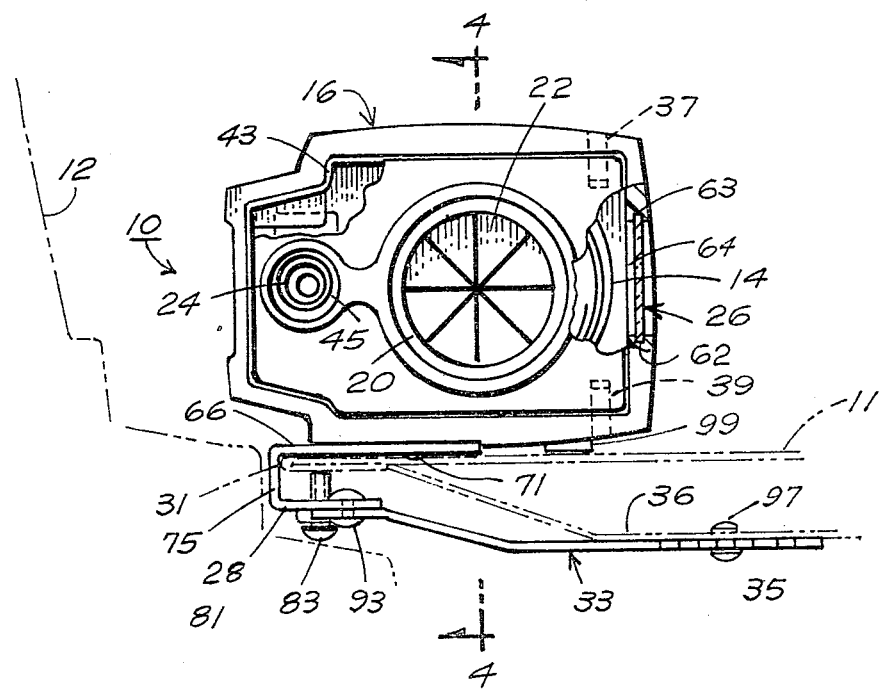
FIG. 3 is an end elevational fragmentary view of the holder of FIG. 1 shown in an enlarged scale.

As best seen in FIGS. 3 and 4 of the drawings, in order to securely mount the holder 10 in position on the hood 11 of the automobile 12, a channel-shaped clamp member 28 fits over and receives an edge or lip 31 of the hood 11 near the windshield 32 of the automobile 12 at one side thereof. The holder 10 is thus positioned fixedly on the automobile 12 for convenient access by police officers and the like. A tongue or hood bracket 33 fastens substantially permanently and fixedly the clamp member 28, as hereinafter described in greater detail, to an inside wall 36 of the vehicle hood 11.

In use, after the holder 10 is installed on the hood 11 as hereinafter described in greater detail, a person, such as a police officer, can take the thin flat generally rectangular document 14 composed of paper material or other thin flexible material and roll it up about a transverse axis into a tubular shape as indicated in FIG. 2. The document is thus rolled up tightly enough that its diameter is sufficiently small to permit it to be slipped through the small opening 20 in the door 18 as indicated in FIG. 4 of the drawings.

Once the rolled-up document 14 is thus inserted into the interior of the housing 16, the document 14 is then free to unwind partially to a partially unstressed condition. In so doing, the rolled-up partially unstressed document 14 assumes a substantially larger diameter and cross-sectional area throughout its length, such diameter being substantially greater than the diameter of the opening 20, thereby trapping the document within the interior of the housing 16 of the holder 10. As a result, the rolled-up partially unstressed document cannot readily be withdrawn from the interior of the housing through the small opening 20. In order to remove the document 14 from the holder 10, the door 18 must be unlocked and swung open to permit access to the document. Thereafter, the door 18 can be swung to its closed position as illustrated in the drawings and locked in place.

It should be noted that it is possible for more than one of the documents to be inserted into the holder 10. If, for example, a second document is to be inserted into the holder 10, the second similar document can be rolled up and inserted through the opening 20 in a similar manner as described previously. In this regard, the second tightly rolled up document is inserted through the opening 20 and axially and telescopically within the first partially unrolled document already in the housing 16.

Figure 5:
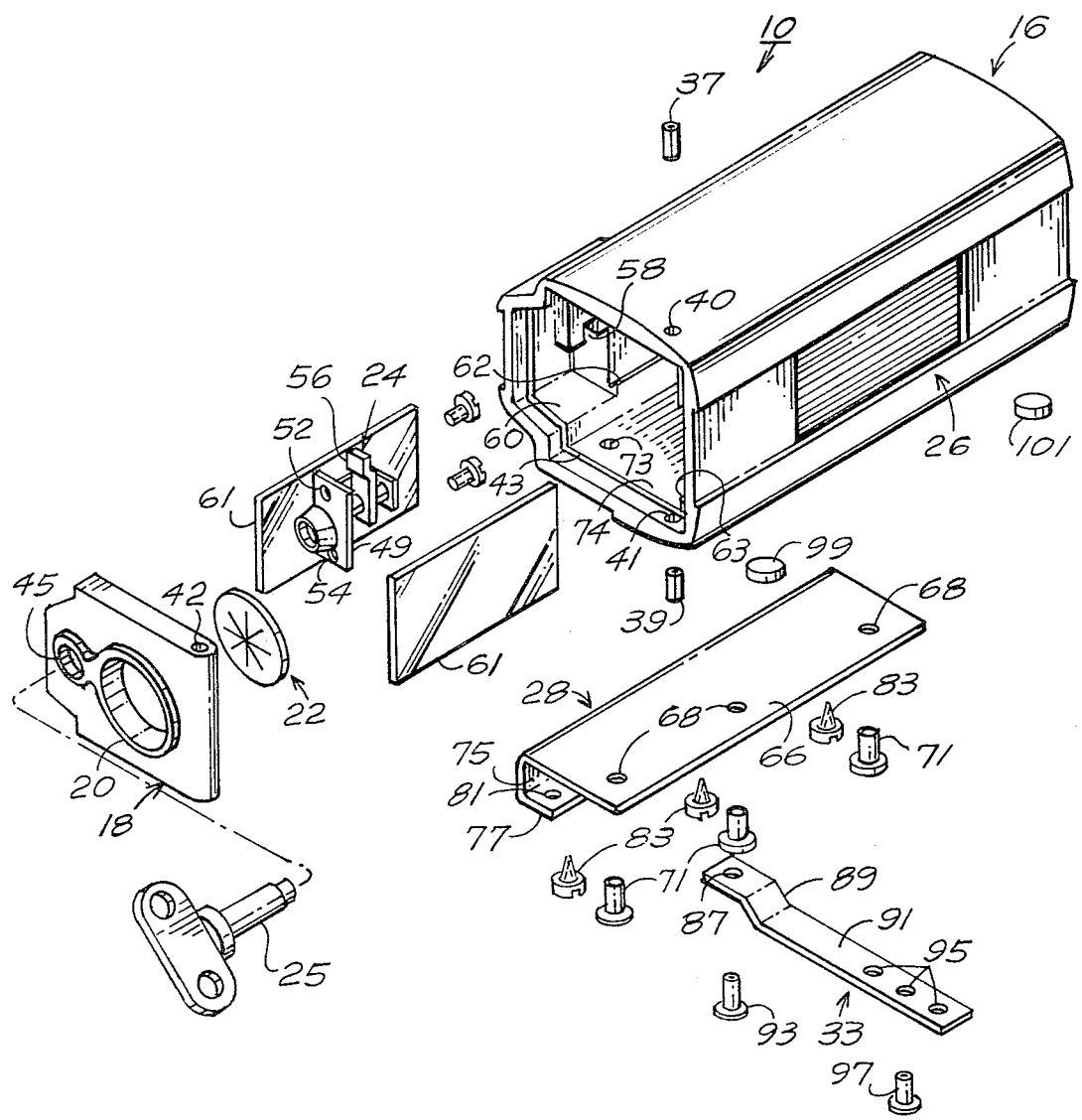
FIG. 5 is an exploded pictorial view of the holder of FIG. 1 illustrated in an enlarged scale.

Considering now the housing 16 in greater detail, with particular reference to FIGS. 3, 4 and 5 of the drawings, the housing 16 includes a pair of vertically and axially aligned hinge pins 37 and 39 which fit into respective aligned openings 40 and 41 in the respective upper and lower walls of the housing 16 and extend into corresponding aligned openings, such as the opening 42 in the top edge at one side thereof of the door 18. As best seen in FIG. 5 of the drawings, the door 18 swings about the hinge pins 37 and 39 between an open position (not shown) and a closed position (FIGS. 3 and 4) in engagement with an internal shoulder 43 surrounding and defining a large opening or mouth 44 at one end of the housing 18. When the door 18 is swung to its open position about the axis of the hinge pins 37 and 39 out of the plane of the large opening 44, the document or documents may be withdrawn conveniently through the large opening 44.

As best seen in FIG. 5 of the drawings, a lock hole or opening 45 extends through the door 18 remote from its hinge pins 37 and 39 to permit access to the lock 24 by the key 25. On the inside of the door 18, as best seen in FIG. 4 of the drawings, an internal boss 45 extends inwardly and has an annular groove 47 for receiving and supporting the peripheral edge of the circular seal member 22 which is fixed thereto by any convenient technique, such as by applying a suitable adhesive material. The seal member 22 is composed of thin flexible material, such as a suitable rubber or plastic material, and is larger in diameter than the diameter of the small hole 20. The member 22 has a series of radially extending slits 22A converging at a point so that the rolled-up document can be pushed through the center of the member 22, which closes over and assumes its flat configuration once the document is slipped entirely therethrough and into the interior of the housing.

Considering now the lock 24 in greater detail with particular reference to FIG. 5 of the drawings, the lock 24 is an adjustable grip lock sold under the trade name "SOUTHCO TOOLHEAD NO. 43", sold by Southco, Inc., 257 Brinton Lake Road, Concordville, Pa. 19331. As shown in FIG. 5, the lock 24 includes a plate 49 having holes 52 and 54 extending therethrough for fastening to the rear face of the door 18 to position a key-receiving conically-shaped front projection 55 within the lock hole 45. A movable locking member 56 disposed on the lock 24 is adapted to be received by a slot 58 of a lock-receiving compartment 60 at the interior of the housing 16.

Considering now the window 26 in greater detail with particular reference to FIGS. 3 and 5 of the drawings, it being understood that the window 27 is generally similar to it, the window 26 includes a transparent plate 61 which may be composed of a suitable plastic or tempered glass material. A pair of confronting upper and lower spaced-apart parallel grooves or slots 62 and 63 extending along a generally rectangular opening 64 in the side wall of the housing 16 receive the upper and lower edges of the plate 61 and are secured in place by suitable adhesive material.

Considering now in greater detail the clamp member 28 and the tongue or hood bracket 33, the member 28 includes a horizontal flange portion 66 which is adapted to overlie the upper surface of the hood lip 31 and has a series of holes 68 therein for receiving rivets 71 which extend therethrough and enter into a series of aligned holes, such as the hole 73 of the bottom wall 74 of the housing 16 to attach fixedly the member 28 to the bottom wall of the housing 16. A vertical portion 75 is integrally connected to one end of the horizontal flange portion 66 and extends to and is integrally connected to a short horizontal flange portion 77 which is disposed under the hood lip 31.

A series of internally threaded holes 81 are disposed in the horizontal flange portion 77 for receiving a series of set screws, such as the screw 83, which extend through the holes 81 into engagement with the underside of the lip 31. A hole 87 in an end portion 88 of the strip 91 of the hood bracket 33 is adapted to be aligned with one of the holes 81 so that a rivet 93 can extend therethrough and secure the tongue or hood bracket 33 to the member 28. A downwardly inclined intermediate portion 89 integrally connects the end portion 88 and a long opposite end portion 94. A series of holes 95 are disposed in the opposite end portion 94 of the strip 91 for receiving a rivet 97 which extends to one of the holes 95 to secure the strip 91 to a convenient land portion of the inside wall 36. The rivet 97 may be inserted in place by any convenient tool, such as a pop rivet tool (not shown).

A pair of adhesive backed resilient bumpers 99 and 101 are disposed on the underside of the bottom wall 74 of the housing 16 to engage the upper surface of the hood 11.

Figure 6:
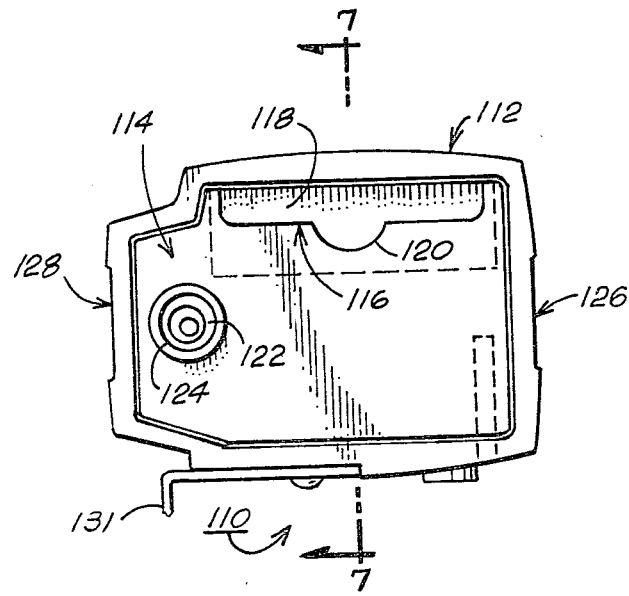
FIG. 6 is an end elevational view of another document holder, which is constructed in accordance with the present invention.
Figure 7:
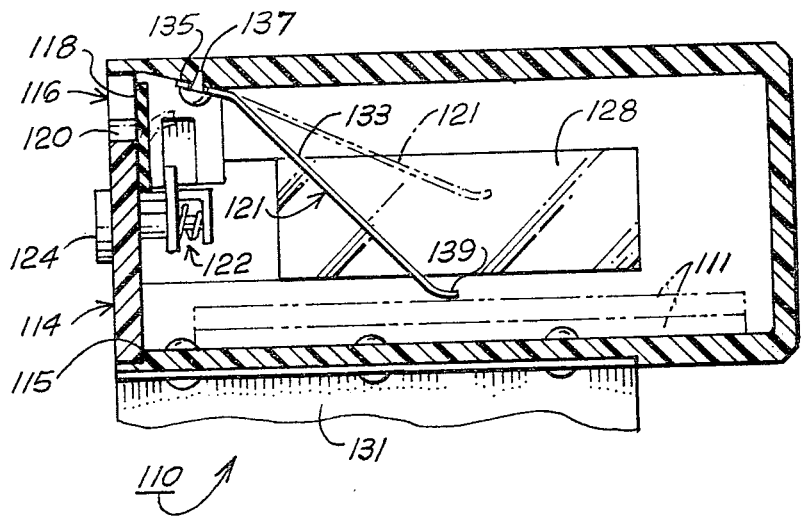
FIG. 7 is a side elevational fragmentary cross-sectional view of the holder of FIG. 6, taken substantially along the line 6—6 thereof.

Referring now to FIGS. 6 and 7 of the drawings, there is shown a ticket holder 110, which is constructed in accordance with the present invention, and which is adapted to receive and retain a folded document 111, such as a parking violation citation. The ticket holder 110 is similar to the holder 10, except that the holder 110 has a greater storage capacity for confining and retaining a series of similar documents. In this regard, when the holder 110 is used to store parking violation citations, oftentimes a series of such citations are issued to the same vehicle, and therefore it may be desirable for some applications to store a series of such documents.

The ticket holder 110 generally comprises an elongated housing 112 having a door 114 swingably attached at one end of the housing 112 to swing between its normally closed position in engagement with an internal shoulder or seat 115 at one end of the housing 112 as illustrated in the drawings and an open position disposed in a vertical plane normal to or at least out of the plane of the door to permit access to the interior of the housing 112 for removal of the document or documents stored therewithin in a similar manner as the door 18 of the holder 10 functions. An elongated opening 116 extending through the door 114 permits a folded-over document 111 to be inserted therethrough and into the interior of the housing 112. In this regard, the document 111 is folded over several times to be sufficiently small in size to slip through the opening 116. A semi-circular enlarged lower central portion 120 of the opening 116 permits a finger of the user to push the document entirely through the opening 116 so that it can drop into the interior of the housing 112.

A hold-down spring 121 is disposed at the interior of the housing 112 adjacent the door 114 and is inclined backwardly from the top wall of the housing 112 to press the folded document against the bottom wall of the housing 112. In this regard, the spring 121 presses against the uppermost folded document when a plurality of such documents are inserted into the interior of the housing 112, as indicated in phantom lines as shown in FIG. 7 of the drawings. In this regard, the elongated opening 116 is disposed near the upper portion of the door 114 so that when the folded documents are inserted one at a time through the opening 116, the folded documents push the spring upwardly as additional documents are pushed into the interior of the housing through the opening 116. In this manner, the documents may be added one at a time through the opening 116 and they are stacked in a vertical pile in the interior of the housing 112 with the spring 121 resting on the uppermost surface of the documents as indicated in FIG. 7 of the drawings to retain them in their folded conditions.

A lock 122 secures releasably the door 114 in its closed position in a similar manner as the lock 24 of the holder 10 maintains the door 18 in its closed position. A lock hole 124 in the door 114 permits access by a key (not shown) to the lock 122. A pair of windows 126 and 128 are disposed in the opposite side walls of the housing 112 in a similar manner as the windows are provided in the holder 10. A clamp member 131 is disposed at the bottom of the housing 112 in a similar manner as the clamp member 28 and hood bracket 33 of the holder 10 for fixing the holder 110 to the hood (not shown) of a vehicle (not shown) in a similar manner as the holder 10 of FIG. 1.

Considering now the spring 121 in greater detail with particular reference to FIG. 7 of the drawings, the spring 121 generally comprises an elongated spring strip 133, which is in the form of a leaf spring cantilevered from the top wall of the housing 112. An apertured bent upper distal end 135 is fixed to the upper wall of the housing 112 by a suitable fastening device, such as the screw 137. A lower bent distal end 139 is adapted to engage the upper surface of the top-most folded document 111.

While particular embodiments of the present invention have been disclosed, it is to be understood that various different modifications are possible and are contemplated within the true spirit and scope of the appended claims. For example, many different types and kinds of materials may be employed for the housing 16 and such materials may include rigid plastic materials, cast aluminum and steel. The materials should be sufficiently sturdy to enable the holder to withstand severe abuse, since it is desirable to enable the holder to remain in tact and thus to protect and to preserve the document confined therein. The housing of the holder of the present invention should be only somewhat larger than a small number of rolled-up or folded-over similar documents. There is no intention, therefore, of limitations to the exact abstract or disclosure herein presented.

The embodiments of the invention in which an exclusive property or privilege is claimed are defined as follows:

1. In a holder having a hollow housing for receiving and confining a document therein and adapted to be attached fixedly to an edge portion of an upper surface of a vehicle, the surface having an inside wall associated therewith, the combination comprising:

said housing being hollow and elongated in shape and being only slightly larger in size than a small number of similar rolled-up or folded-over documents;

means defining a small opening in said housing to permit a rolled-up or folded-over document to be inserted through said opening and into the interior of said housing away from said small opening so that the document cannot be readily withdrawn from said opening to trap the document therein;

an access door swingably mounted over a larger opening in said housing for permitting access to the interior of said housing to facilitate the removal of the document therefrom;

locking means for maintaining said door in its closed position;

mounting means connected to said housing for attaching said housing to the edge portion of the surface on the vehicle, said mounting means having a fixedly connected strip extending therefrom under the inside wall; and fastening means for fixing said strip to the inside wall only to secure said housing to the vehicle.

2. In a holder, the combination according to claim 1, wherein said housing includes at least one window means therein for viewing one or more documents confined within said housing.

3. In a holder, the combination according to claim 1, wherein said mounting means includes a channel-shaped member adapted to receive said surface, said surface being an edge portion of a hood of the vehicle, and fastening means for attaching said member fixedly in position.

4. In a holder, the combination according to claim 3, wherein said strip being fixedly attached to the channel-shaped member.

5. In a holder, the combination according to claim 4, wherein said strip includes a short flat distal end portion adapted to be fixedly connected to said channel-shaped member, an intermediate angularly inclined portion terminating in a flat longer distal end portion, said long distal end portion being apertured at its opposite end for receiving at least one rivet for attaching said strip to the underside of the hood of the vehicle.

6. In a holder, the combination according to claim 1, wherein said small opening is a circular hole for receiving a coiled or rolled-up document.

7. In a holder, the combination according to claim 1, wherein said small opening is an elongated opening for receving a folded-up document.

8. In a holder, the combination according to claim 7, wherein said elongated hole includes a generally semi-circularly shaped enlarged portion at the lower edge thereof adapted to permit the finger of the user to push the folded-up document entirely within the interior of the housing.

9. In a holder, the combination according to claim 7, further including hold-down spring means mounted within the interior of the housing for pushing down onto the top one of a stack of folded-up similar documents.

10. In a holder, the combination according to claim 1, further including a flexible seal member covering over said small opening at the inside of said housing.

* * * * *